# (12) United States Patent
Baer et al.

(10) Patent No.: US 7,515,381 B2
(45) Date of Patent: Apr. 7, 2009

(54) METHOD FOR FABRICATING A SIDE SHIELD FOR A FLUX GUIDE LAYER FOR PERPENDICULAR MAGNETIC RECORDING

(75) Inventors: Amanda Baer, Campbell, CA (US); Daniel Wayne Bedell, Gilroy, CA (US); Quang Le, San Jose, CA (US); Aron Pentek, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 433 days.

(21) Appl. No.: 11/317,917

(22) Filed: Dec. 22, 2005

(65) Prior Publication Data

US 2007/0146931 A1    Jun. 28, 2007

(51) Int. Cl.
  *G11B 5/147*    (2006.01)
  *G11B 5/187*    (2006.01)
(52) U.S. Cl. .............................. 360/125.3; 360/125.04; 360/125.06; 360/125.08
(58) Field of Classification Search .............. 360/125.3, 360/125.03, 125.04, 125.06, 125.08, 125.12
See application file for complete search history.

(56) References Cited

U.S. PATENT DOCUMENTS

| | | | |
|---|---|---|---|
| 5,901,018 A | 5/1999 | Fontana, Jr. et al. | 360/104 |
| 6,069,015 A | 5/2000 | Gray et al. | 438/3 |
| 6,301,077 B1 | 10/2001 | Sasaki | 360/126 |
| 6,510,030 B1 | 1/2003 | Song et al. | 360/319 |
| 7,009,812 B2 * | 3/2006 | Hsu et al. | 360/125.12 |
| 7,212,379 B2 * | 5/2007 | Hsu et al. | 360/125.16 |
| 7,253,991 B2 * | 8/2007 | Fontana et al. | 360/125.3 |
| 7,265,941 B2 * | 9/2007 | Le et al. | 360/125.3 |
| 7,268,974 B2 * | 9/2007 | Lille | 360/125.06 |
| 2004/0004787 A1 | 1/2004 | Matono et al. | 360/126 |
| 2004/0064934 A1 | 4/2004 | Nemoto | 29/603.13 |
| 2007/0230046 A1 * | 10/2007 | Le et al. | 360/126 |
| 2007/0247750 A1 * | 10/2007 | Hsiao et al. | 360/126 |

* cited by examiner

*Primary Examiner*—Jefferson Evans
(74) *Attorney, Agent, or Firm*—Zilka-Kotab, PC

(57) ABSTRACT

A magnetic head for use in a perpendicular recording system having a novel shield structure that provides exceptional magnetic shielding from extraneous magnetic fields such as from a write coil, shaping layer or return pole of the write head. The shield structure is constructed to have a bottom or leading surface that is generally coplanar with the bottom or leading surface of the shaping layer, but all or a portion of the shield structure is not as thick as the shaping layer so as to have a top surface that does not extend to the same elevation (in a trailing direction) as that of the shaping layer. Making the shields extend to a lower level than the shaping layer improves magnetic performance by reducing flux leakage from the write pole, and also provides manufacturing advantages, such as during the manufacturing of the write pole. These manufacturing advantages include the advantage of having the shields covered with a protective layer of, for example, alumina during the ion milling of the write pole.

14 Claims, 20 Drawing Sheets

METHOD FOR FABRICATING A SIDE SHIELD FOR A FLUX GUIDE LAYER FOR PERPENDICULAR MAGNETIC RECORDING

FIELD OF THE INVENTION

The present invention relates to a magnetic write head for perpendicular magnetic recording and more particularly to a novel method for a method for manufacturing a magnetic shield that avoids damage to other components of the write head.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head traditionally includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

When a spin valve sensor employs a single pinned layer it is referred to as a simple spin valve. When a spin valve employs an antiparallel (AP) pinned layer it is referred to as an AP pinned spin valve. An AP spin valve includes first and second magnetic layers separated by a thin non-magnetic coupling layer such as Ru. The thickness of the spacer layer is chosen so as to antiparallel couple the magnetizations of the ferromagnetic layers of the pinned layer. A spin valve is also known as a top or bottom spin valve depending upon whether the pinning layer is at the top (formed after the free layer) or at the bottom (before the free layer).

The spin valve sensor is located between first and second nonmagnetic electrically insulating read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

Magnetization of the pinned layer is usually fixed by exchange coupling one of the ferromagnetic layers (AP1) with a layer of antiferromagnetic material such as PtMn. While an antiferromagnetic (AFM) material such as PtMn does not in and of itself have a magnetization, when exchange coupled with a magnetic material, it can strongly pin the magnetization of the ferromagnetic layer.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetic transitions oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

One problem that has arisen as a result of such perpendicular recording systems is that the magnetic medium is particularly susceptible to stray magnetic fields. Ideally all of the magnetic field picked up by the medium would come from the write pole, the resulting flux then passing through the soft underlayer of the medium to return to the return pole. In actuality, however, because the soft underlayer is so sensitive to magnetic fields, it is affected by magnetic fields from the write coil, and from magnetic fields coming directly from the shaping layer to the medium. The shaping layer is a magnetic structure that channels magnetic flux to the write pole. In perpendicular recording designs, these magnetic fields from the coil and the shaping layer have been found to generate a significant amount of flux concentrated at the corners of the return pole and/or the shields. When the write head is operated at high write currents, the fields under these corners are high and potentially can cause data erasure. The situation is worsened when the writing is performed in the presence of an external field.

This problem could be ameliorated by moving the write coil and the shaping layer away from the ABS, however, this would cause a loss of write head efficiency by making it difficult to produce a strong write field from the write pole at a reasonable write current. One attempt to overcome the problem of magnetic signal erasure from the coil and the shaping layer has been to provide a shield that extends from the return pole toward the write pole. Such a design is described in United States Patent Application US2003/0227714A1 entitled PERPENDICULAR MAGNETIC RECORDING HEAD HAVING A REDUCED FIELD UNDER THE RETURN POLE AND MINIMAL EDDY CURRENT LOSSES. While the design described in the above identified patent application does help to lessen the effects of such unwanted fields, it has been found that the soft underlayer is so sensitive that signal erasure might still occur, depending on the media property and the strength of external fields.

Therefore, there is a strong felt need for a design for a perpendicular writer to overcome the signal erasure problem that occurs as a result of unwanted magnetic fields such as those from the write coil and the shaping layer. Such a design would also preferably not lead to loss of write field, and would be produced by a process that does not adversely affect the formation of the write pole. Such a design would also preferably allow the coil and shaping layer to be located near enough to the ABS to provide excellent magnetic writer performance, while still avoiding data erasure.

SUMMARY OF THE INVENTION

The present invention provides magnetic write head for perpendicular recording that has novel shield structure that provides excellent protection against inadvertent erasure of data due to extraneous magnetic fields from portions of the write head such as the write coil, return pole or shaping layer. The write head includes a magnetic return pole and a magnetic shaping layer that is magnetically connected with the return pole. A magnetic write pole is magnetically connected with the shaping layer and extends to the air bearing surface (ABS).

The write head also includes a pair of magnetic shields or flux catchers. These shields have a bottom surface (leading surface) that is coplanar with the bottom or leading surface of the shaping layer. The shields are, however thinner than the shaping layer so that their top or trailing surface is does not extend as far in the trailing direction (ie. toward the write pole) as does the trailing surface of the shaping layer. Because the shields do not extend as far in the trailing direction as the shaping layer does, the trailing edge of the shields can be covered with a layer of non-magnetic material such as alumina. This non-magnetic layer protects the shields during subsequent formation of the write pole.

Because the shields do not extend as far in the trailing direction as the shaping layer (ie. they are not as thick as the shaping layer) a small desired additional spacing is provided between the shields and the write pole. This improves magnetic performance by preventing flux leakage from the write pole to the shield.

The shields and shaping layer can be constructed by at least two processes. For example, when alignment between the shields (flux catchers) and the shaping layer is not aggressive, the shield and shaping layer can be plated using separate photo and plating steps. First a magnetic seed layer such as $Ni_{80}Fe_{20}$ can be deposited. Then, a first photolithography is done to pattern a photoresist mask, to define (for example) the shaping layer. A magnetic material is then deposited to plate, for example the shaping layer. This first mask is stripped off, and a second photo is done to pattern a photo resist mask to define, for example, the shields (flux catchers). Magnetic material is then plated to a desired thickness (different than the thickness of the first plated magnetic layer) and the second mask is stripped off, and the seed layer is removed, such as by reactive ion etching (RIE). If the flux guide is plated first, then the second plating will be to a smaller thickness than the first plating. Then, a layer of non-magnetic material is deposited and chemical mechanically polished (CMPed) until the flux guide is exposed.

Another method can be used, when the alignment between the shield (flux catcher) and the shaping layer is more aggressive, such as when the available space between them is very small. This method can include first depositing an electrically conductive seed layer over a substrate. A layer of RIEable material such as $SiO_2$, $Si_3N_4$, $SiO_xN_y$, $Ta_2O_5$, or DLC can then be deposited over the seed layer. The RIEable material should also be an electrically insulating material.

A first mask, such as a photoresist mask, can then be formed over the layer of RIEable material so that the first mask covers a first area and leaves a second area uncovered. A first reactive ion etch (first RIE) can then be performed to remove portions of the RIEable material in the second area that are not covered by the first mask. The first mask can then be removed and a second mask can be formed. The second mask has a first opening, disposed over the second area (where the RIEable material has been removed) and a second opening, at least a portion of which is disposed over the first area (where the RIEable material remains). The first opening defines a shaping layer and the second opening defines a shields structure. In a first electroplating process, a magnetic material is deposited into the first opening. The magnetic material will not plate into a desired portion of the second opening at this point because the electrically insulating RIEable material remains at the bottom of the second opening.

The second mask can be left intact after the first plating and a second RIE can be performed to remove the RIEable material remaining at the bottom of the second opening, thereby exposing the electrically conductive seed layer. Then, a second electroplating process can be performed to plate magnetic material into the second opening. Since the first opening already had some magnetic material deposited, the shaping layer defined by the first opening will be thicker than the shield defined by the second opening. This method allows the shield (or shields) to be defined along with the shaping layer using a common mask, while still allowing the shaping layer and at least a portion of the shield to be plated to different thicknesses. By allowing both structures to be defined by the same mask structure there is no need to align multiple masks in multiple photolithographic processes. The shield and shaping layer can therefore be defined with excellent accuracy and placement relative to one another.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
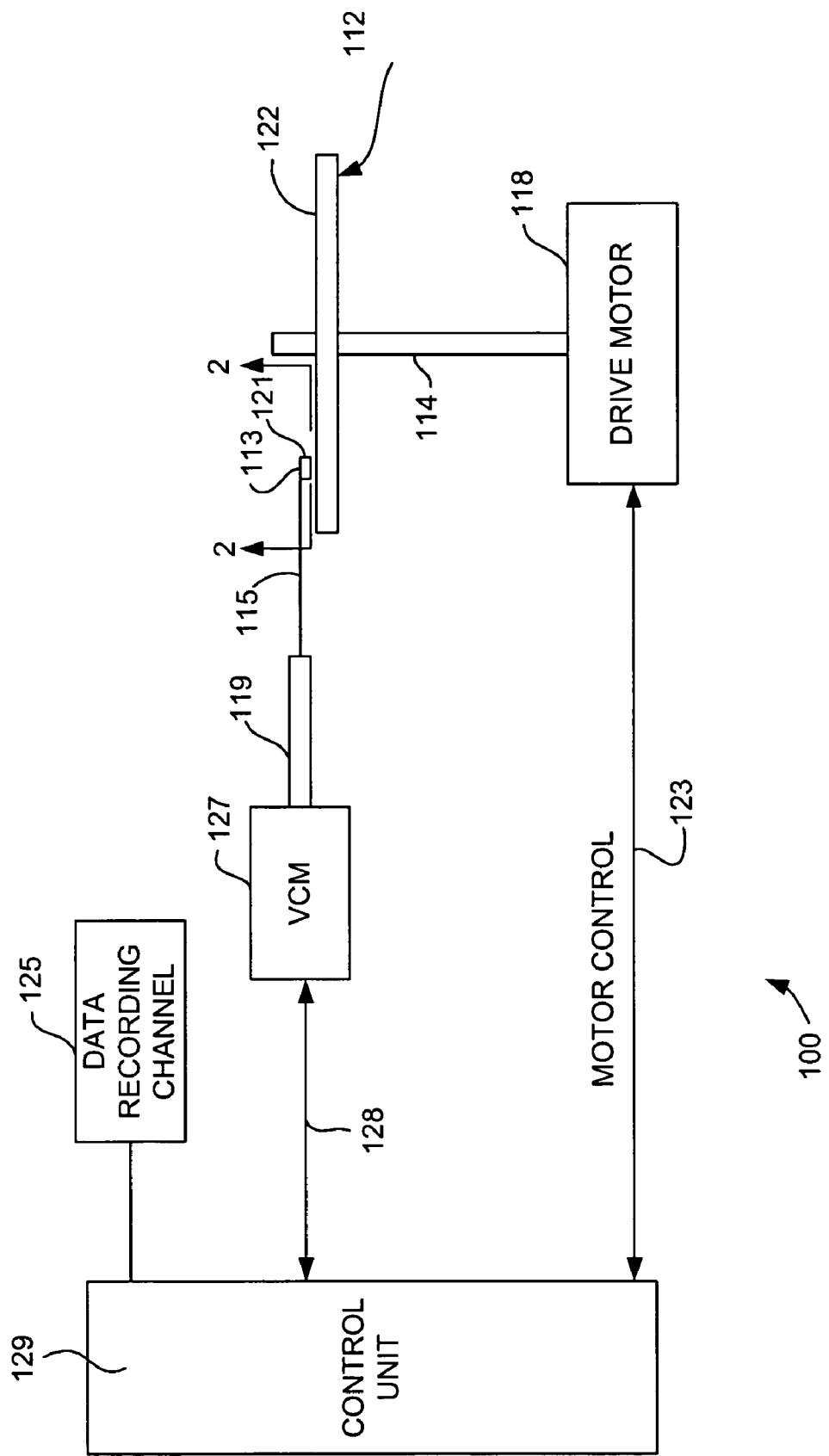
FIG. 1 is a schematic illustration of a disk drive system in which the invention might be embodied.
Figure 2:
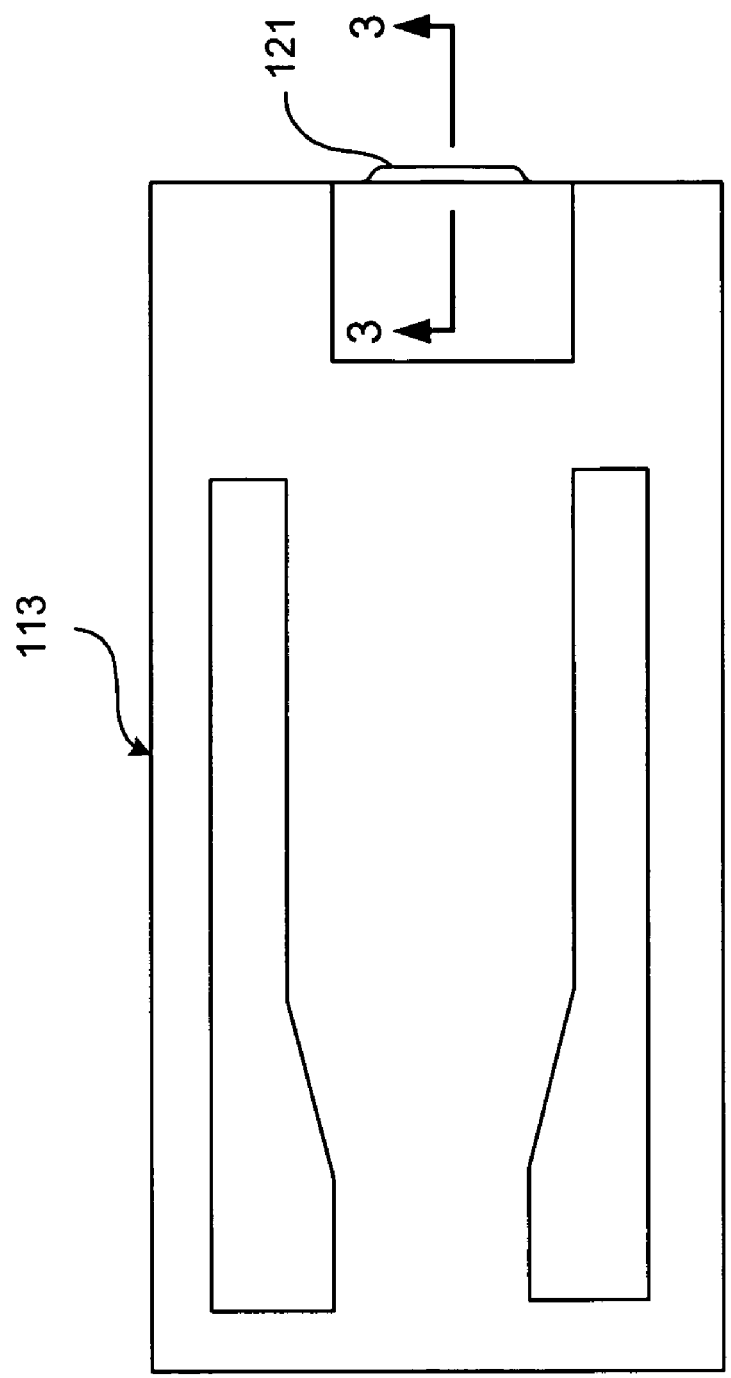
FIG. 2 is an ABS view of a slider, taken from line 2-2 of FIG. 1, illustrating the location of a magnetic head thereon.

Referring now to FIG. 1, there is shown a disk drive 100 embodying this invention. As shown in FIG. 2, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 217 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

With reference to FIG. 2, the orientation of the magnetic head 121 in a slider 113 can be seen in more detail. FIG. 2 is an ABS view of the slider 113, and as can be seen the magnetic head, including an inductive write head and a read sensor, is located at a trailing edge of the slider. The above description of a typical magnetic disk storage system and the accompanying illustrations of FIGS. 1 and 2 are for representation purposes only. It should be apparent that disk storage systems may contain a large number of disks and actuators, and each actuator may support a number of sliders.

Figure 3:
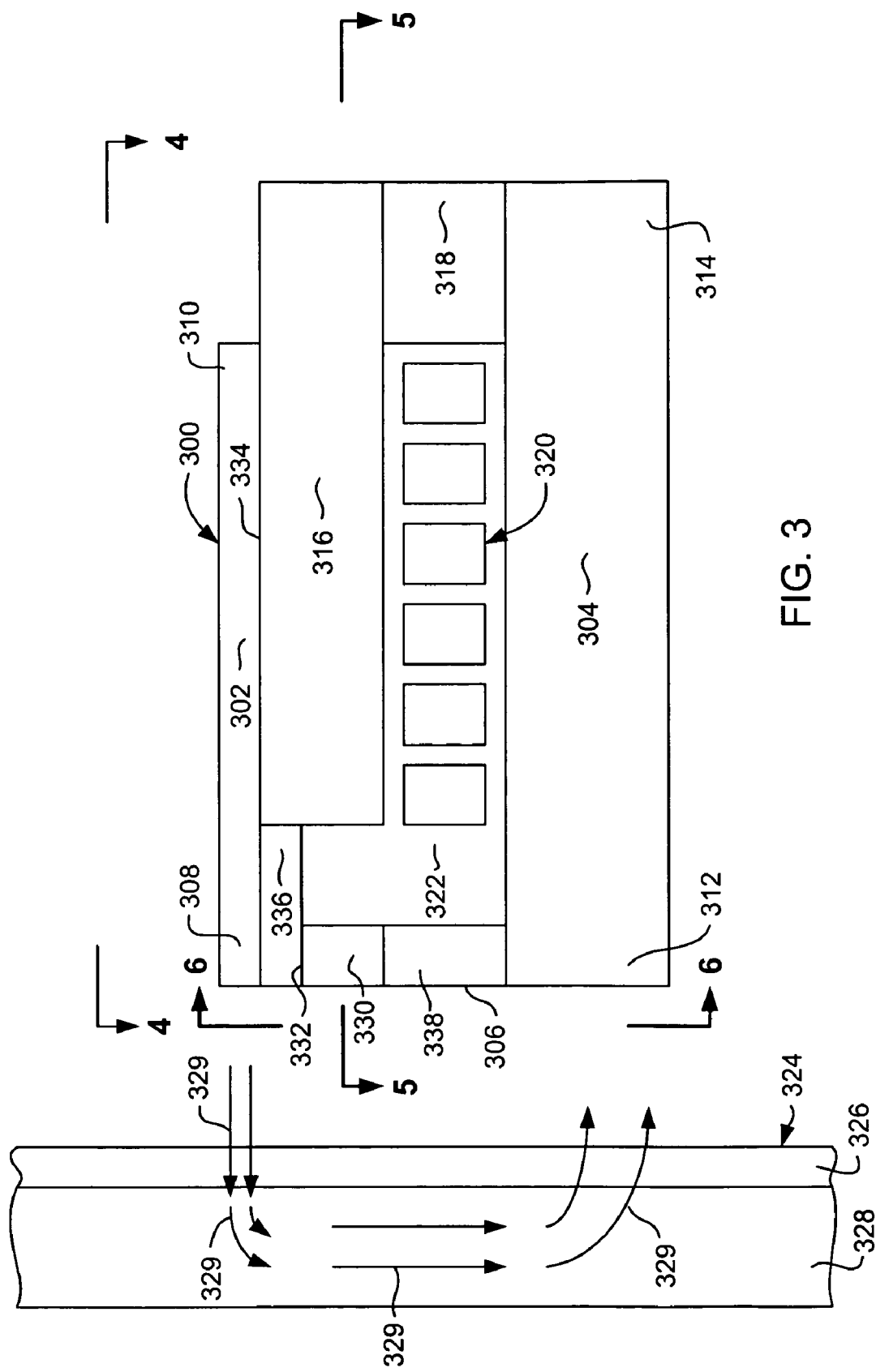
FIG. 3 is a cross sectional view, taken from line 3-3 of FIG. 2 and rotated 90 degrees counter clockwise, of a magnetic write head according to an embodiment of the present invention.

With reference now to FIG. 3, a magnetic write head 300 according to an embodiment of the present invention includes a write pole 302 and a return pole 304. The write pole and return pole 302, 304 each extend to the air bearing surface (ABS) 306. Therefore, the write pole has an ABS end 308 and a back end 310. Similarly, the return pole has an ABS end 312 and a back end 314. A shaping layer 316 is magnetically connected with the write pole 302 and channels magnetic flux to the write pole 302. A magnetic pedestal or back gap layer 318 magnetically connects the shaping layer 316 with the return pole 304 at a back gap location located away from the ABS 306. A pedestal 331 may also be provided at the ABS end of the return pole, extending toward the write pole. The shaping layer 316, back gap 318 and return pole 304 can be constructed of a magnetic material (preferably a material capable of being electroplated) such as NiFe or some other magnetic material. The write pole 302 is preferably constructed of a high magnetic moment, saturation (high Bsat) material such as CoFe or $Ni_{50}Fe_{50}$.

With continued reference to FIG. 3, the magnetic write head includes an electrically conductive, non-magnetic coil 320, preferably having multiple turns, a portion of which pass through the write head 300 between the shaping layer 316 and write pole 302 and the return pole 304. The coil 320 can be constructed of, for example Cu and is electrically insulated from the magnetic structures of the write head 300 by an insulation layer 322, which can be for example one or more layers of Alumina $Al_2O_3$, silicon dioxide $SiO_2$, hard baked photoresist or some other material or combination of materials.

When current is conducted through the coil 320, a magnetic field is generated, causing a magnetic flux to flow through the return pole 304, back gap 318, shaping layer 316 and write pole 302. An adjacent magnetic medium 324 having a thin magnetically hard surface layer 326 and a magnetically soft underlayer 328 completes the magnetic circuit. Field emitted from the write pole 302 generates a magnetic flux 329 in the magnetic medium which passes through the soft under layer 328 and returns to the return pole 312. The magnetic field from the write pole 302 is strong and focused and locally magnetizes the high moment surface layer 326 of the medium 324. After passing through the magnetically soft under layer 328 the magnetic flux returns to the return pole where it is sufficiently spread out and weak that it does not erase signals produced by the write pole 302.

As discussed above in the Background of the Invention, prior art write head designs suffered from the problem that extraneous magnetic fields, such as those from the write coil 320 and shaping layer 316 have been sufficiently strong to erase previously recorded magnetic data, especially at the presence of external stray fields. While moving the coil 320 and shaping layer 316 away from the ABS 306 would alleviate such a problem, doing so would result in an unacceptable loss of head performance. The coil 320 must be located close enough to the ABS 306 to provide a sufficiently strong write field from the write head 302. Similarly, moving the shaping layer 316 away from the ABS would not allow sufficient magnetization of the write pole 302 at the ABS end 308.

Figure 5A:
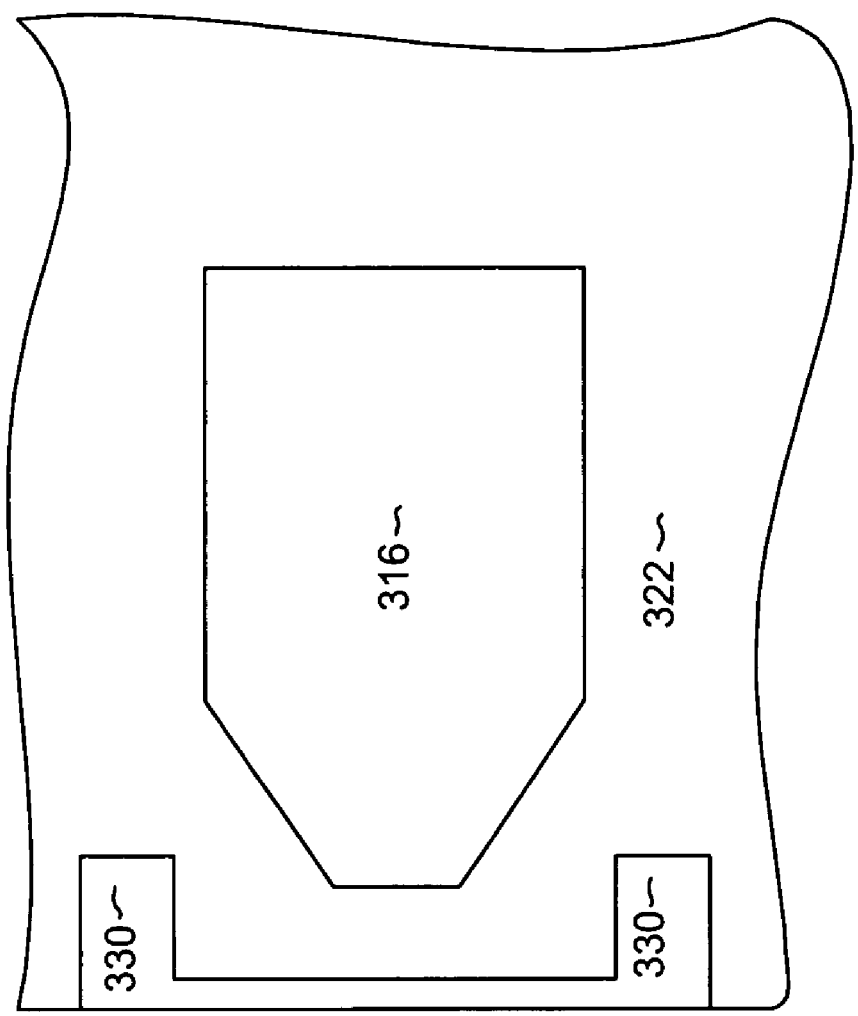
FIG. 5A is a view taken from line 5A-5A of FIG. 3.
Figure 5B:
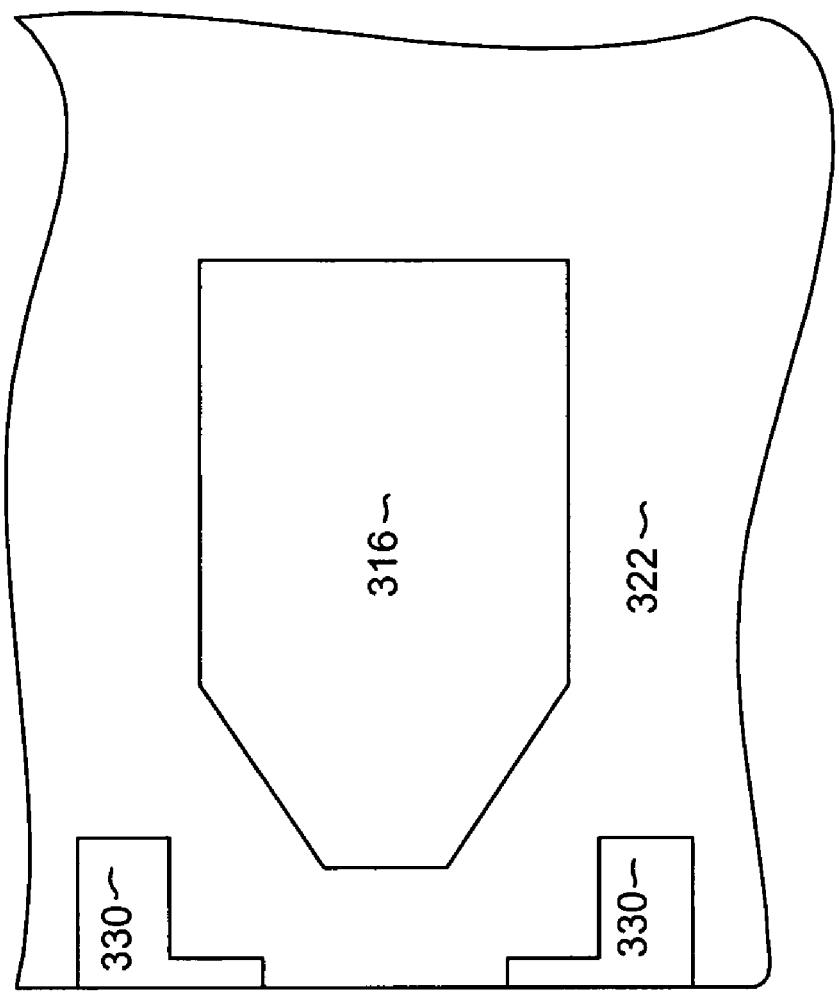
FIG. 5B is a view taken from line 5B-5B of FIG. 3.
Figure 6A:
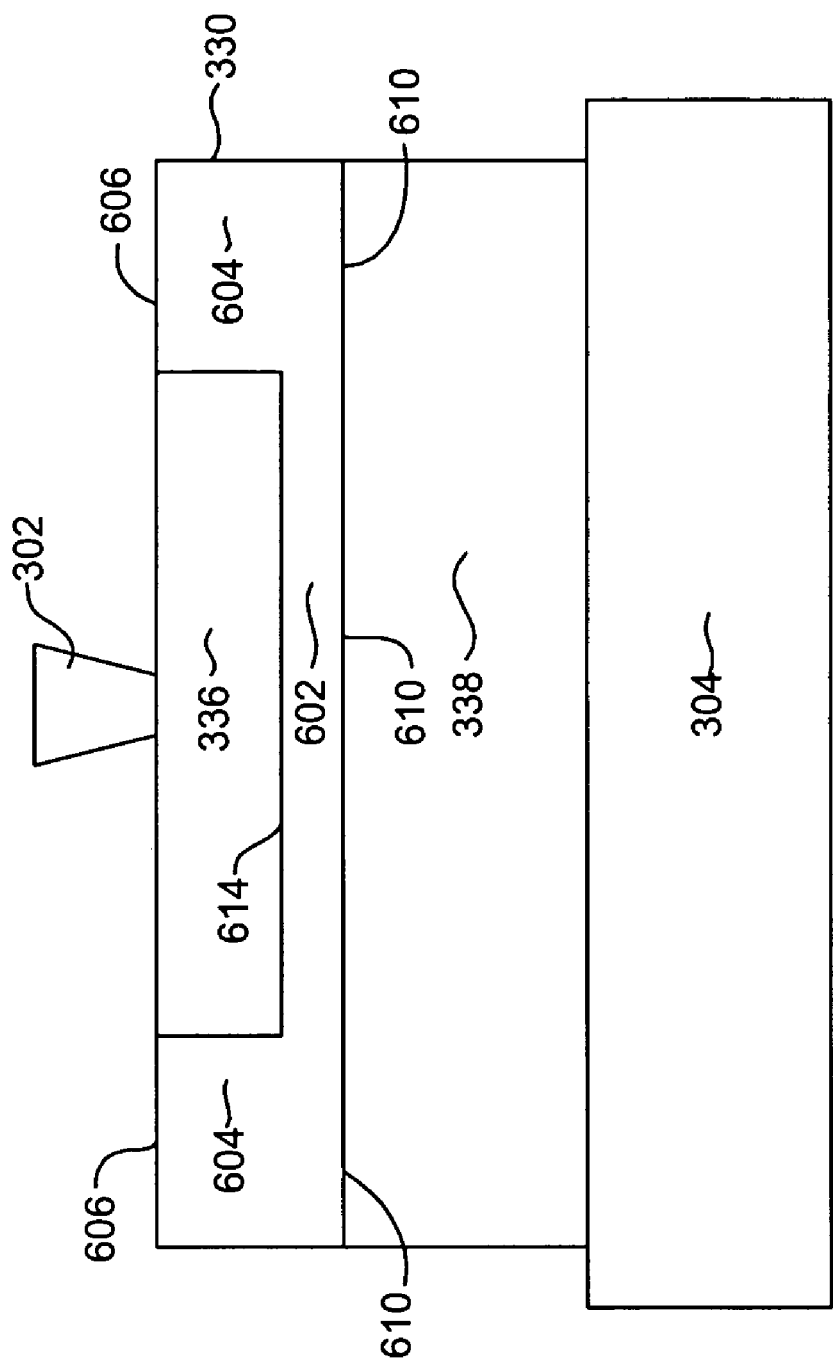
FIG. 6A is an ABS view taken from line 6A-6A of FIG. 3.
Figure 6B:
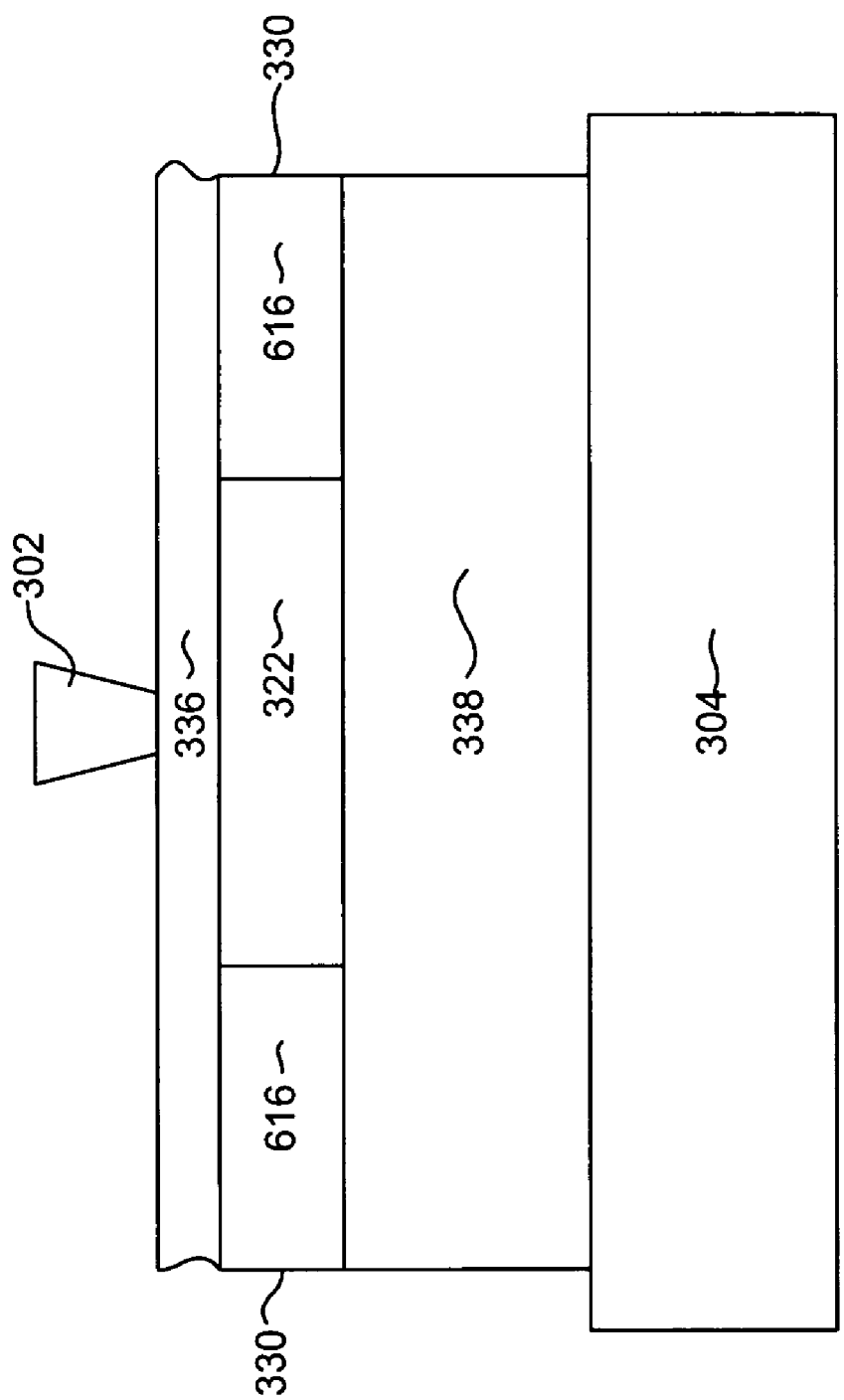
FIG. 6B is a view similar to FIG. 6A of an alternate embodiment of the invention.

The present invention provides a novel magnetic shield or "flux catcher" design 330 that prevents magnetic fields, such as those from the write coil 320 shaping layer 316 or return pole 304, from reaching or affecting the magnetic medium 324. With reference to FIGS. 5A and 6A, it can be seen that flux catcher design 330 may be a single structure, or as illustrated in FIGS. 5B and 6B, may actually include a pair of shields 616. The shield 330 absorbs magnetic fields from the write coil 320, and shaping layer 316, drawing such fields back into the magnetic structure of the write head so that they will not adversely affect the magnetic medium. As can be seen in FIGS. 3, 6A and 6B, the shield 330 is magnetically connected with a shield or pedestal structure 338, which is magnetically connected with the return pole. The pedestal 338 acts itself as a shield, magnetically shielding the media 324 from any extraneous fields that might be emitted from the coil 320 or other structure. The pedestal 338 also serves to magnetically connect the flux catcher shields 330 to the return pole. It should be pointed out that the shields 330 are actually out of the plane of the page as shown in FIG. 3, as the shields 330 are not positioned directly beneath the write pole 302. This will become clearer with reference to FIGS. 4 and 5, which are described in greater detail below. The shields 330, as well as the pedestal 338 can be constructed of a magnetic material, such as NiFe. Similarly, the return pole 304, back gap 318 and shaping layer 316 can be constructed of a magnetic material such as NiFe or some other material.

Figure 4:
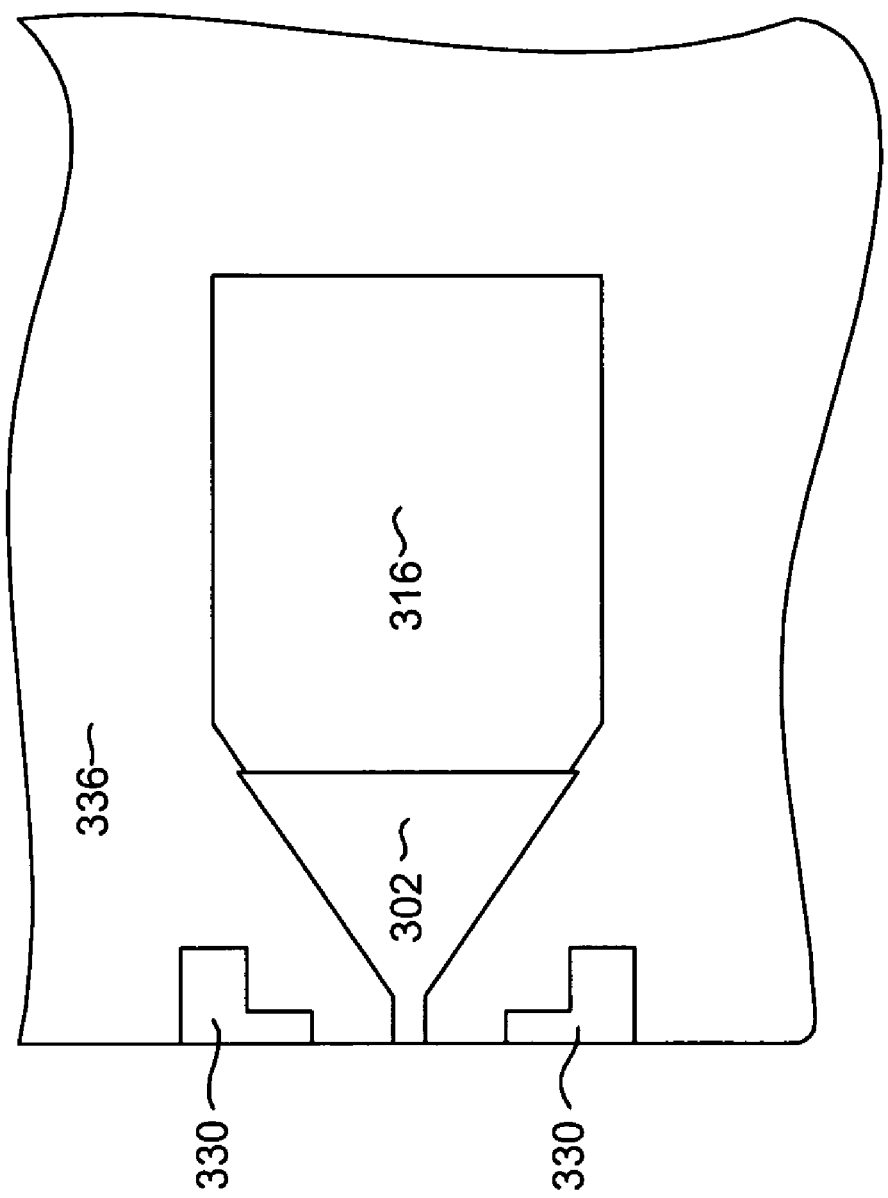
FIG. 4 is a view, taken from line 4-4 of FIG. 3.

With reference to FIG. 4 a view taken from line 4-4 of FIG. 3 shows the write pole 302 on top of the shaping layer 316. The flux catcher shield 330 is buried into the plane of the page in FIG. 4, being covered by the protective layer of alumina 336.

With reference now of FIG. 5A, a cross sectional view taken from line 5A-5A of FIG. 3, shows the relative orientations of the shield 330 and shaping layer 318 according to one possible embodiment of the invention. As can be seen, the shield 330 is separated from the shaping layer 316 by a certain minimum distance. The shield 330 in this embodiment 330, is formed as a single shield extending all of the way across the front of the shaping layer. This embodiment may be desirable where maximum shielding is needed, but also provides a necessary minimum spacing between the shield 330 and the write pole 302.

With reference to FIG. 6A, in one embodiment of the invention it can be seen that the shield 330 includes a relatively thin center portion 602 and relatively thick outer portions 604. The thicker outer portion 604 may have at thickness that is equal to the thickness of the shaping layer 316 (FIG. 5A), and may have an upper (or trailing) surface 606 that is coplanar with the upper (or trailing) surface 608 of the shaping layer 316 (FIG. 3). The shield 330 has a bottom or leading surface 610 that extends across both the outer portions 604 and inner center portion 602. This bottom or leading surface is coplanar with a bottom or trailing surface 612 of the shaping layer 316.

The center or inner portion 602 has an upper or trailing surface 614 that is lower than the upper surface 608 of the shaping layer 316 (FIG. 3). In other words, the upper or trailing surface 614 of the center portion 602 of the shield 330 does not extend as far in the trailing direction as the upper or trailing surface 608 of the shaping layer 316 (FIG. 3). Making the center portion 602 of the shield 330 thinner, allows a desired minimum spacing to be maintained between the write pole 302 and the center portion 602 of the shield 330. A non-magnetic protective layer 336 separates the center portion 602 of the shield 330 from the write pole 302 and also protects the center portion 602 of the shield 330 during the manufacture of the write pole 302.

When the write head is made very small, so as to increase areal density of a recording system, the distance between the shields 330 and the shaping layer becomes extremely small and difficult to maintain. FIGS. 5B and 6B illustrate an alternate embodiment of the invention, wherein the flux catcher 330 includes a pair of separate shields 616, 618. This embodiment facilitates the maintenance of a desired minimum spacing, providing additional protection against flux leakage from the write pole 302 to the flux catcher 330. The first and second shields 616, 618 each have a bottom or leading surface 620 that is coplanar with the bottom or leading surface 612 of the shaping layer 316 (FIG. 3). The shields 616 each have an upper surface 622 that does not extend as far in the trailing direction as the upper or trailing surface 608 of the shaping layer 316. This means that the shields 616 are not as thick as the shaping layer 316 (FIG. 3) and also do not extend to the same level (in the trailing direction) as the write pole 302.

The shield 330 can have various configurations, and as shown in FIGS. 5A and 5B, can outer portions the bend back away from the ABS (ie. toward the shaping layer 316), wherein the outer portions of each shield 330 has a wider portion near the ABS 306 and narrower that is recessed from the ABS. As mentioned above, the distance between the shields 330 and the shaping layer is important. Limited available space on a very small write head 300 requires that the shield 330 be close to the shaping layer. However, a certain minimum distance must be maintained in order to prevent write flux from leaking from the shaping layer 316 to the shields 330.

Constructing the shield 330 so that all or a portion of it does not extend to the same height as the shaping layer provides several advantages. Magnetic performance is improved, because the shields 330 can provide the desired magnetic shielding, while maintaining a desired increased distance from the write pole. Constructing the shields 330 to a lower elevation prevents magnetic flux from leaking from the write pole to the shields 330, thereby ensuring that a strong write field will be emitted from the write pole. Preferably, in the embodiment described in FIGS. 5B and 6B, the shields 330 have a thickness that is about 0.5-1.0 um less than the thickness of the shaping layer 316. Similarly, in the embodiment described in FIGS. 5A and 6A the center portion 602 of the flux catcher shield 330 preferably has a thickness that is 0.5-1.0 um less than the thickness of the shaping layer 316.

Constructing the shield 330 to a lower height also provides advantages during manufacture. As will be described in grater detail below, the write pole 302 is formed by depositing magnetic material, preferably laminations of magnetic material separated by thin layers of non-magnetic material. This magnetic layer is then masked and ion milled with a series of ion mill steps that removes portions of the magnetic material that are not covered by the mask and forms the write pole with a desired trapezoidal shape as viewed from the ABS.

If the shield 330 were constructed to the same level as the shaping layer 316, then the ion milling of the write pole 302 would necessarily reach the shields 330. The magnetic material of which the shields 330 are constructed would be milled away much faster than the alumina insulation layer surrounding them. Therefore, the shield 330 would be damaged by the ion mill used to form the write pole. What's more, the milling away of the shields 330 causes an uneven surface which results in poor write pole definition.

It can be seen that the shields 330 and the shaping layer have coplanar bottom surfaces and could be formed by electroplating using a commonly deposited seed layer. However, as also can be seen, the shields 330 are not plated as thick as the shaping layer 330. One way to form the shaping layer 316 and shields 330 to different heights is to use two separate photo and plating steps. In this method, a common seed layer of electrically conductive (preferably magnetic) material is deposited on a substrate such as an alumina layer. A first photo mask is formed to define a first area, for example the shaping layer 316. A magnetic material is then plated into the first area. This first photo mask is then stripped away and a second photoresist mask is formed to define a second area, such as for example the shields 330. A magnetic material is then electroplated into the second area, but at a different thickness than that deposited into the first area. Of course, the order of which element is plated first (shaping layer 316 or shields 330) can be reversed, the point being that they are formed in separate photolithographic and plating processes. After the shields 330 and shaping layer 316 have been formed, a layer of non-magnetic material such as alumina can be deposited and chemical mechanically polished (CMP) to open up the top of the shaping layer, leaving a protective layer of alumina over the shields 330.

This method could also be used to form a structure such as that described in FIGS. 5A, and 6A. To form such a structure, the first mask would define the first area to include the shaping layer 316 and the thicker outer portions 604 of the flux catcher 330. Then, the second mask would be constructed to define the second area, which includes both the first area (shaping layer 316, and outer portion 604 of the flux catcher 330) as well as the thinner inner portion 602 of the flux catcher 330. Since the outer portions 604 of the flux catcher 330 and the shaping layer 316 are plated twice and the inner portion 602 is only plated once, the outer portions 604 and the shaping layer 316 will be plated to the same thickness and will be thicker than the thinner center portion 602 of the flux catcher 330 (which is only plated once in the second plating process).

Figure 7:
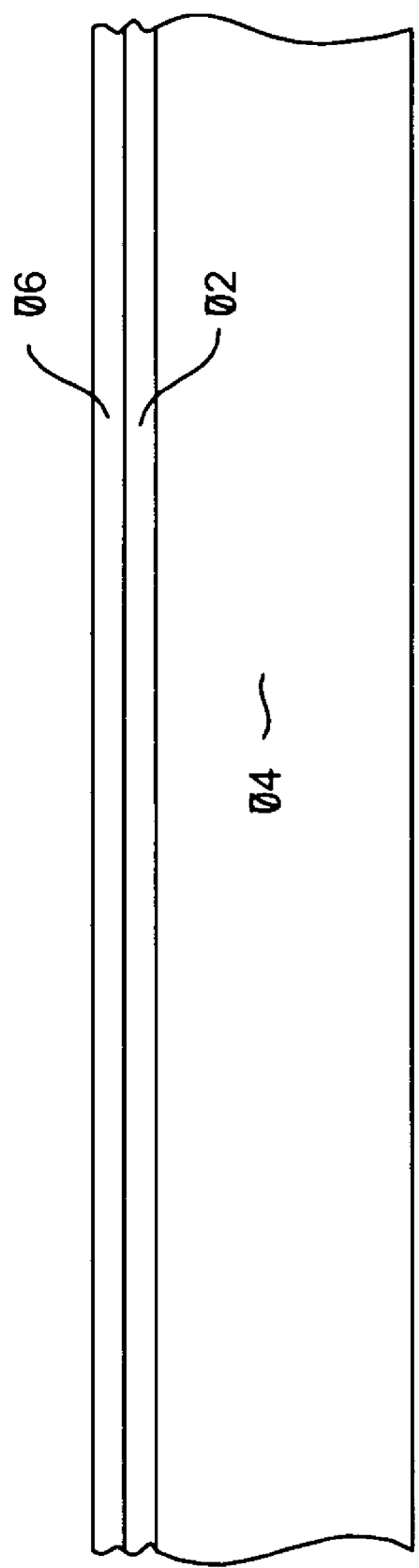
FIGS. 7-14 are cross sectional views of a portion of a write head shown in various intermediate stages of manufacture, illustrating a method of manufacturing a shaping layer and magnetic shields.

With reference to FIGS. 7-14, an alternate method for constructing the shaping layer 316 and the shields 330 using a single photolithographic alignment is illustrated. This method provides improved definition of the structures 330, 316, by eliminating the need to align multiple mask structures. With particular reference to FIG. 7, an electrically conductive seed layer 702 is deposited over a substrate 704. The substrate 704 can be a combination of non-magnetic electrically insulating fill material such as alumina and a portion of the pedestal 338 (FIG. 3). A thin layer of electrically insulating RIEable material 706 such as $SiO_2$ is then deposited over the seed layer 702.

Figure 8:
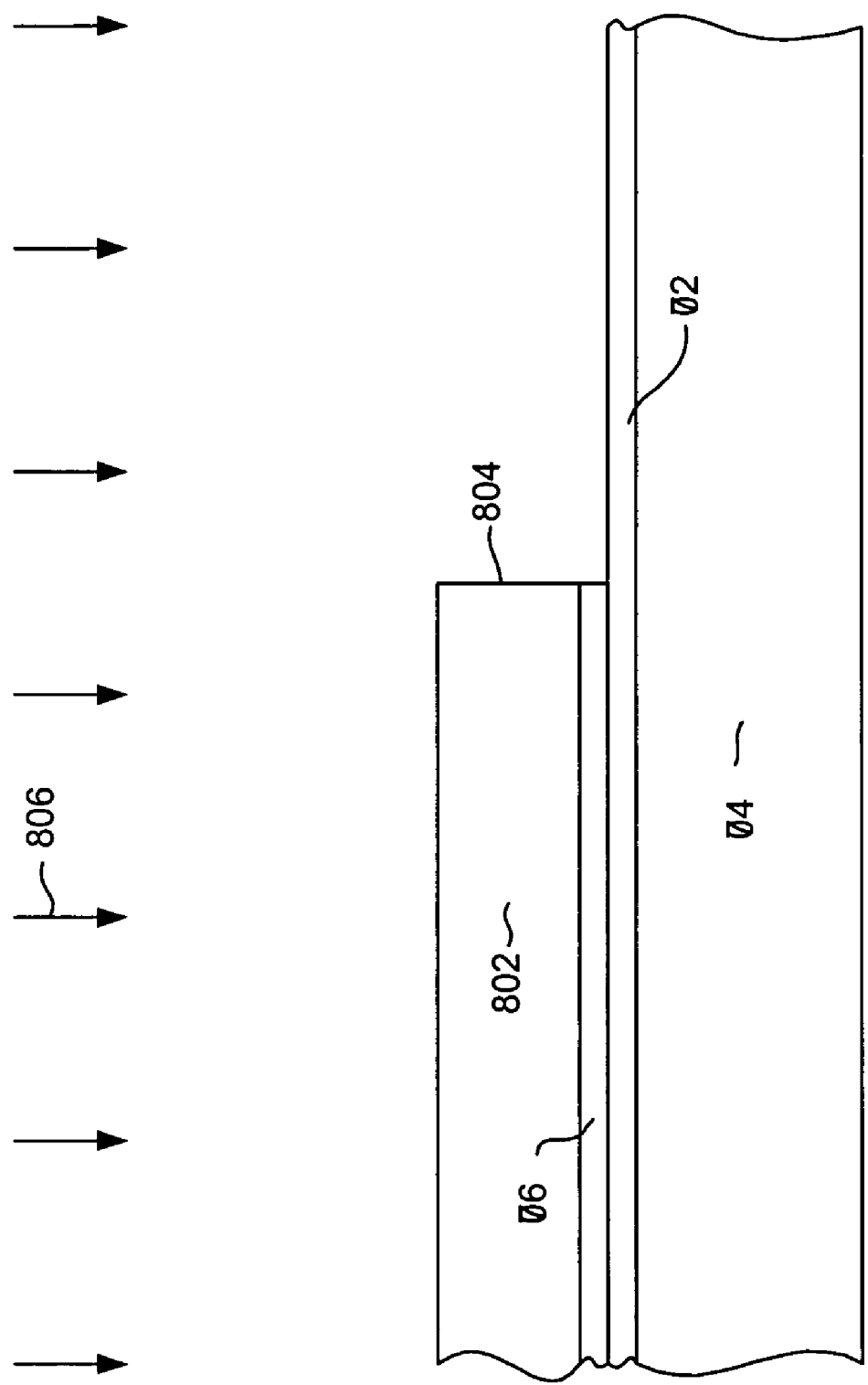

Then, with reference to FIG. 8, a photoresist mask 802 is formed. The mask 802 covers at least a portion of the area where the shield 330 is to be plated and leaves open areas where the shaping layer 316 is to be electroplated. For example, to form the structure described with reference to FIGS. 5A and 5B, the mask 802 can leave open areas where the shaping layer 316 will be located and can also open up areas where the outer portions 604 of the flux catcher 330 will be, leaving the inner portion 602 covered. To form the structure shown in FIGS. 5B and 6B, the first mask 802 can open up only the shaping layer 316 (FIG. 3) leaving the areas of the flux catcher 330 (shields 616) covered.

The mask 802 has an edge 804 that terminates at some point between where the shaping layer 316 and covered portions of the flux catcher shields 330 (FIGS. 5A, 5B) will be plated. Then, a reactive ion etch (RIE) 806 is performed to remove portions of the electrically insulating layer 706 that are not covered by the mask 802. The type of RIE used should be chosen to be one that will easily remove the electrically insulating material 706. For example, if the layer 706 is $SiO_2$, then the RIE can be performed in a fluorine based atmosphere, such as $CHF_3$ and/or $CF_4$.

Figure 9:
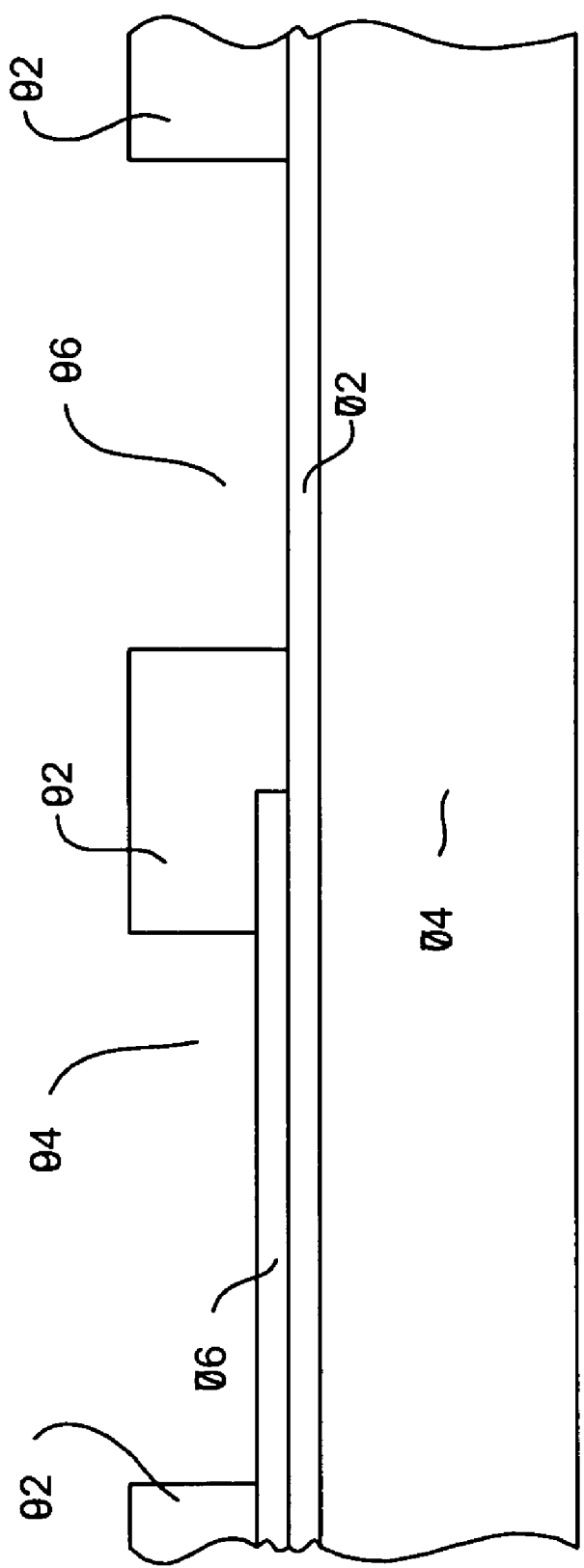

With reference now to FIG. 9, second photo-mask 902 is constructed. The photo mask is constructed by spinning on a photosensitive material such as photoresist and then photolithographically patterning the photoresist. The mask 902 has openings 904, 906 defining the areas where the shaping layer 316 and flux catcher shield 330 (FIGS. 5A, 5B) will be. As can be seen, the remaining insulation layer 706 is disposed within one of the openings 904, but not the other 906. The insulation layer 706 will be disposed within the openings 904 where the thinner portion 602 of the shield 330 will be plated (for the embodiment of FIGS. 5A, 6A) or where the shields 616 will be (for the embodiment of FIGS. 5B, 6B) as will be explained below.

Figure 10:
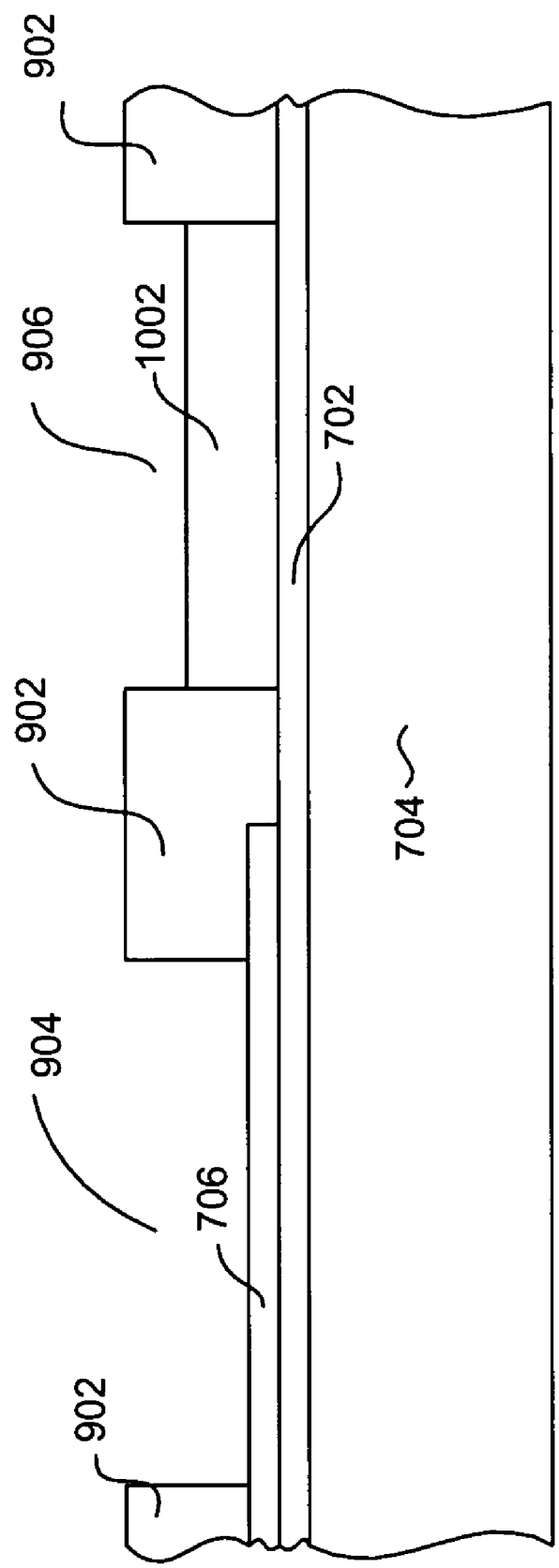
Figure 11:
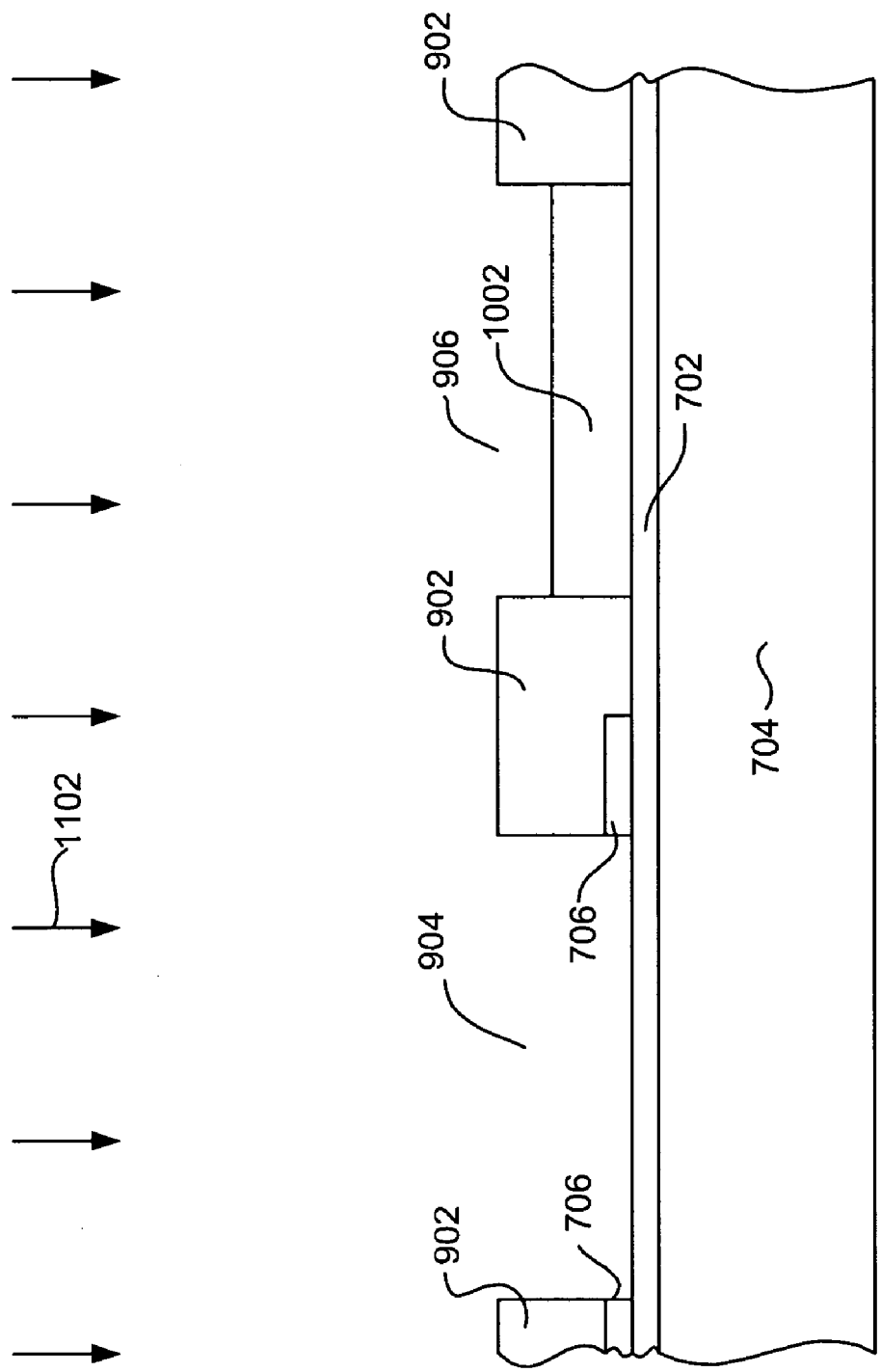

With reference now to FIG. 10, a magnetic material 1002 such as NiFe can be electroplated into the opening 906 to start the plating of the shaping layer 316 (and possibly the outer portion 604 of the shield 330). As can be seen, the seed layer 702 in the region of the opening 904 is still covered with the insulation layer 706 so that no magnetic material will be plated into this opening 904. After plating has progressed a desired amount, with reference to FIG. 11, a second reactive ion etch 1102 is performed to remove the insulation material 706 from within the opening 904. As with the prior RIE 806 (FIG. 8), this RIE 1102 is preferably performed in such a manner that it will easily remove the insulation layer 706. For example, if the insulation layer 706 is $SiO_2$, then the RIE can be performed in a fluorine based atmosphere, such as one containing $CHF_3$ and or $CF_4$.

Figure 12:
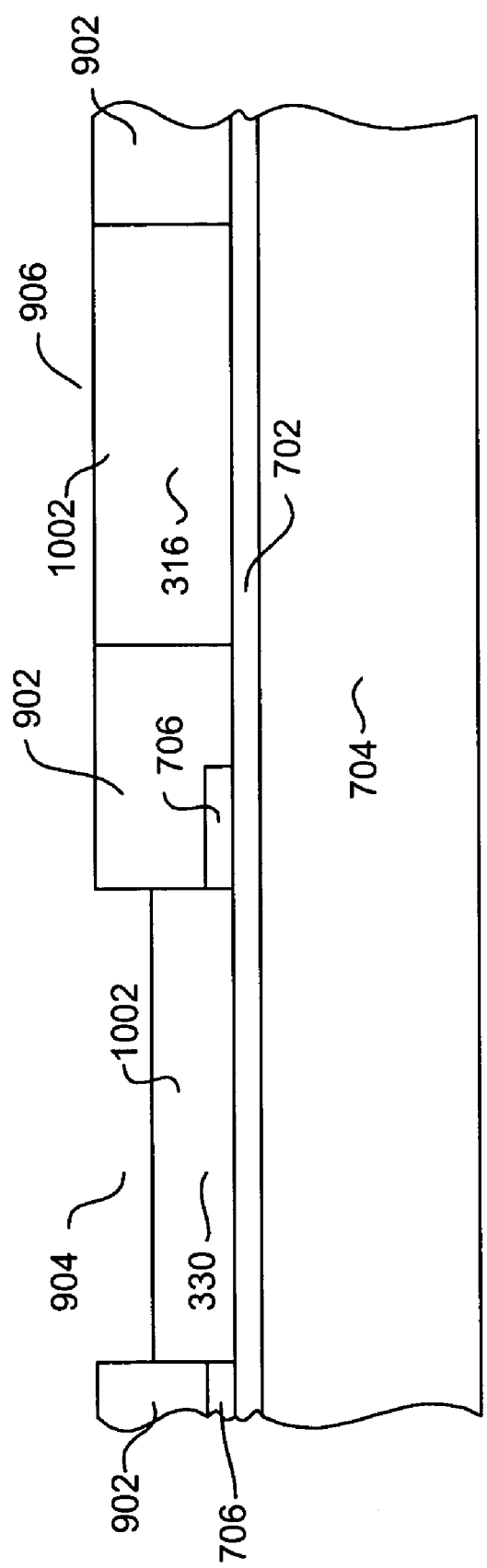

With reference now to FIG. 12, further electroplating of magnetic material 1002 can be performed. This time, with the insulation material 706 removed from both openings 904, 906, the magnetic material 1002 will be electroplated into both openings 904, 906. However, because some magnetic material 1002 was already plated into the opening 906, that opening has a head start and will remain thicker than the material 1002 in the other opening 904. When the material 1002 reaches a desired thickness, plating is terminated resulting in a shaping layer 316 that is significantly thicker than the shields 330.

Figure 13:
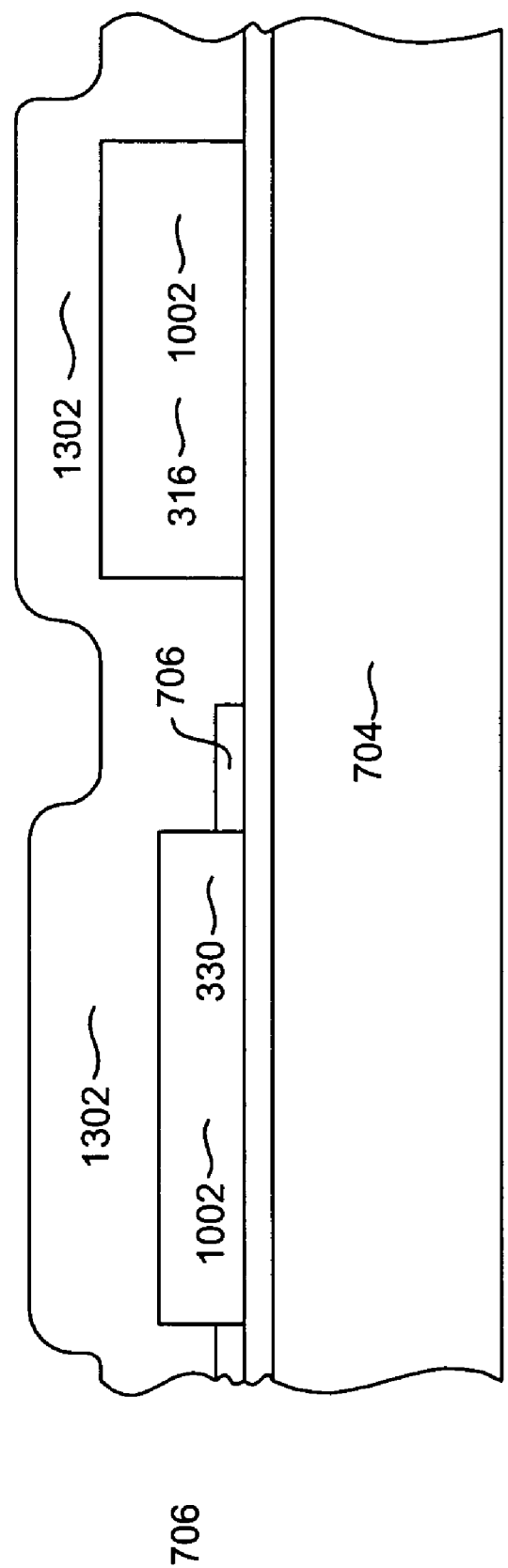
Figure 14:
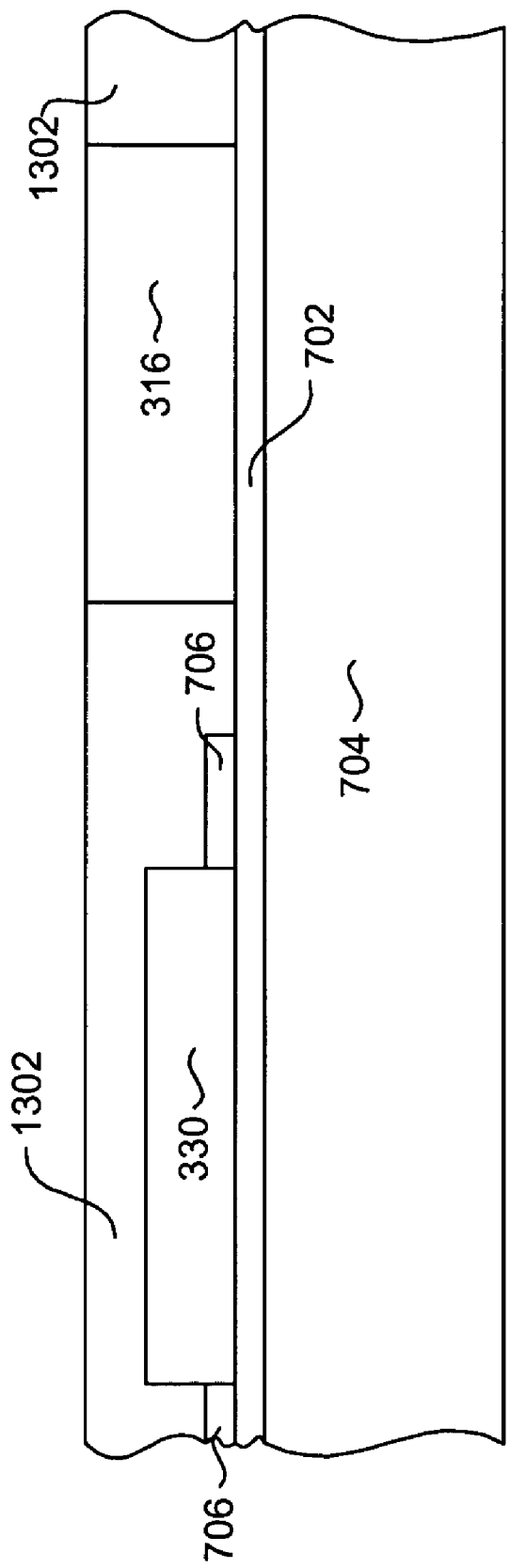

Then, with reference to FIG. 13, the remaining photo mask can be removed (lifted off), and a layer of alumina 1302 or some other non-magnetic material can be deposited. With reference to FIG. 14, a chemical mechanical polishing process (CMP) can be performed to planarize the alumina and expose the shaping layer 316, resulting in smooth coplanar surfaces across the alumina 1302 and shaping layer 316.

The previously described method results in a smooth topography on which to form a write pole 302. FIGS. 15-18 are ABS views illustrating the construction of the write pole.

Figure 15:
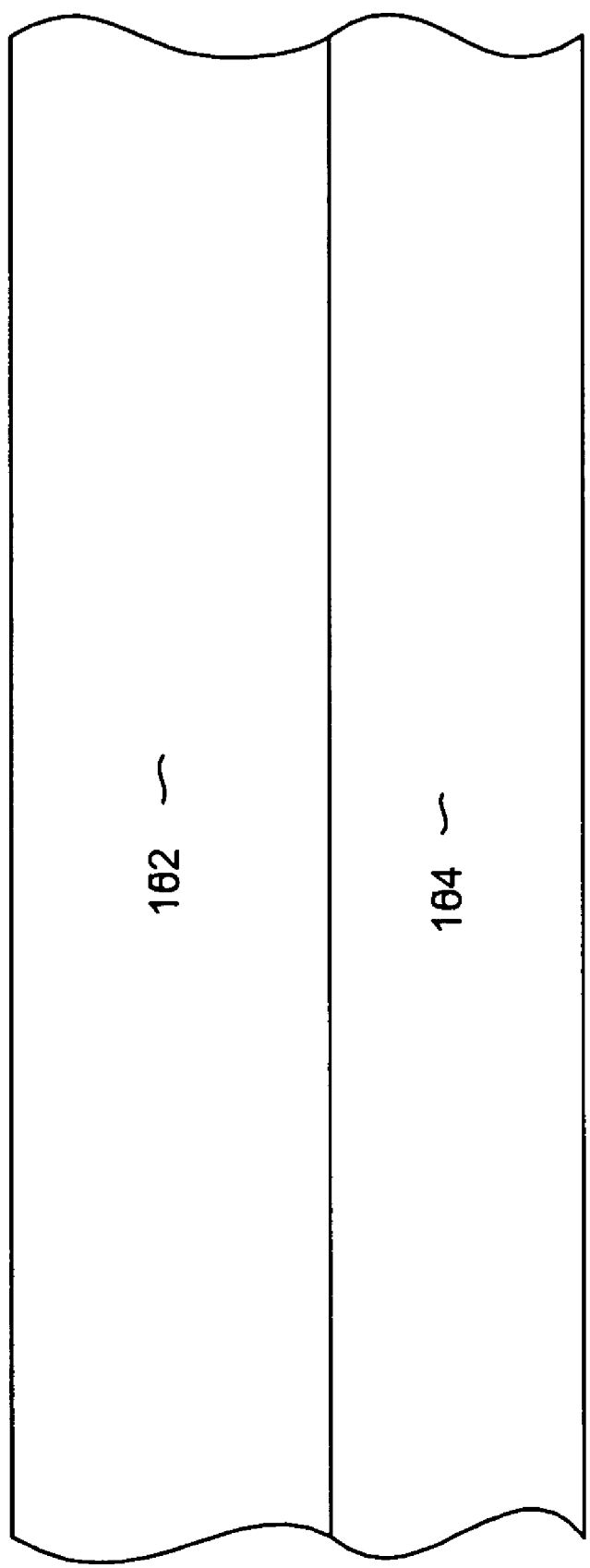
FIGS. 15-18 are cross sectional views of a portion of a write head shown in various intermediate stages of manufacture, illustrating a method of manufacturing a write pole of a write head.
Figure 16:
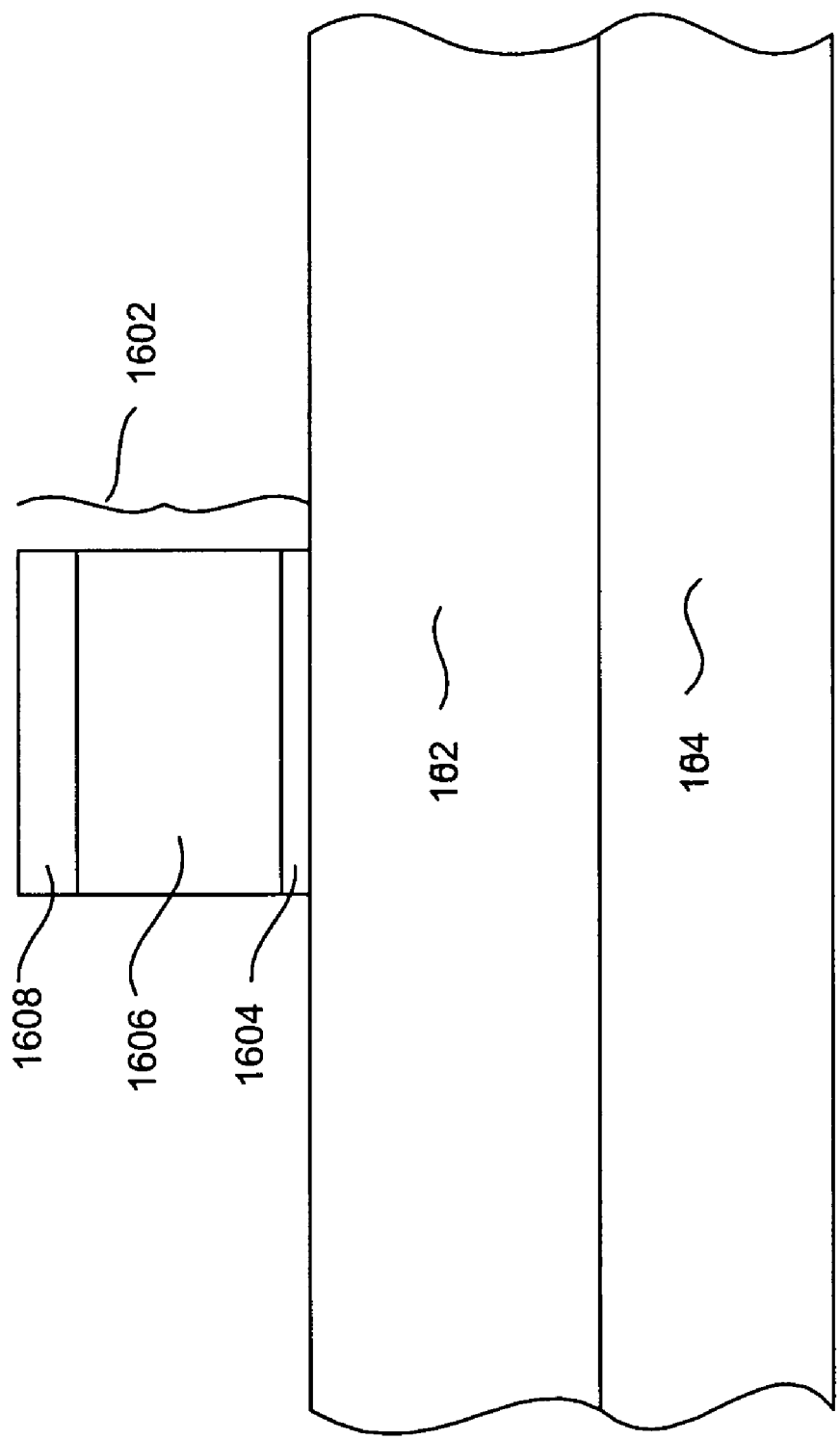

With reference to FIG. 15, a magnetic write pole material 1502 is deposited on a substrate 1504. This write pole material 1502 may include laminations of magnetic material separated by thin layers of non-magnetic material. Then, with reference to FIG. 16 a mask 1602 is formed. The mask may include one or more hard masks 1604 such as alumina, an image transfer layer 1606 such as DURIMIDE®, and a photoresist mask 1608.

Figure 17:
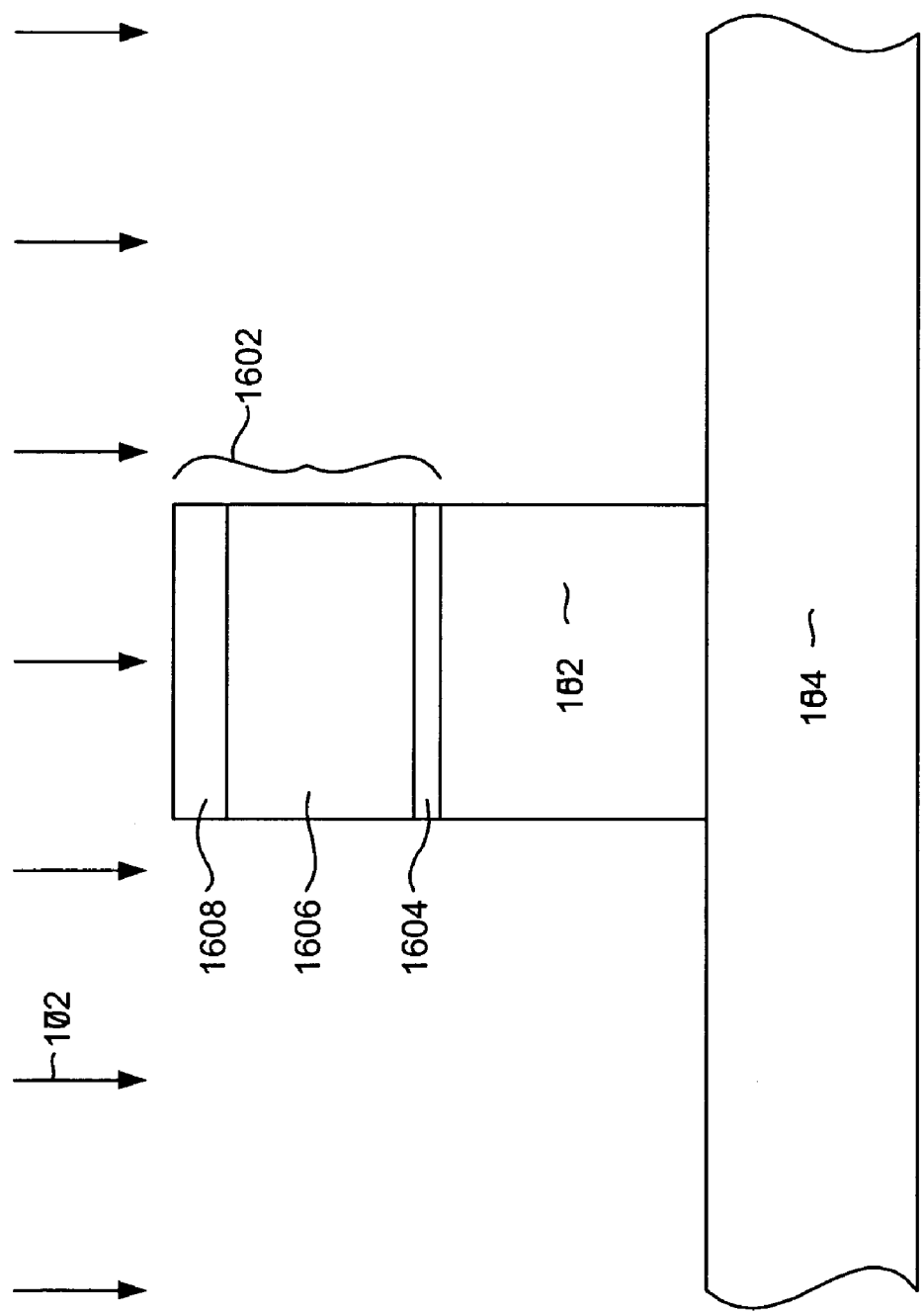
Figure 18:
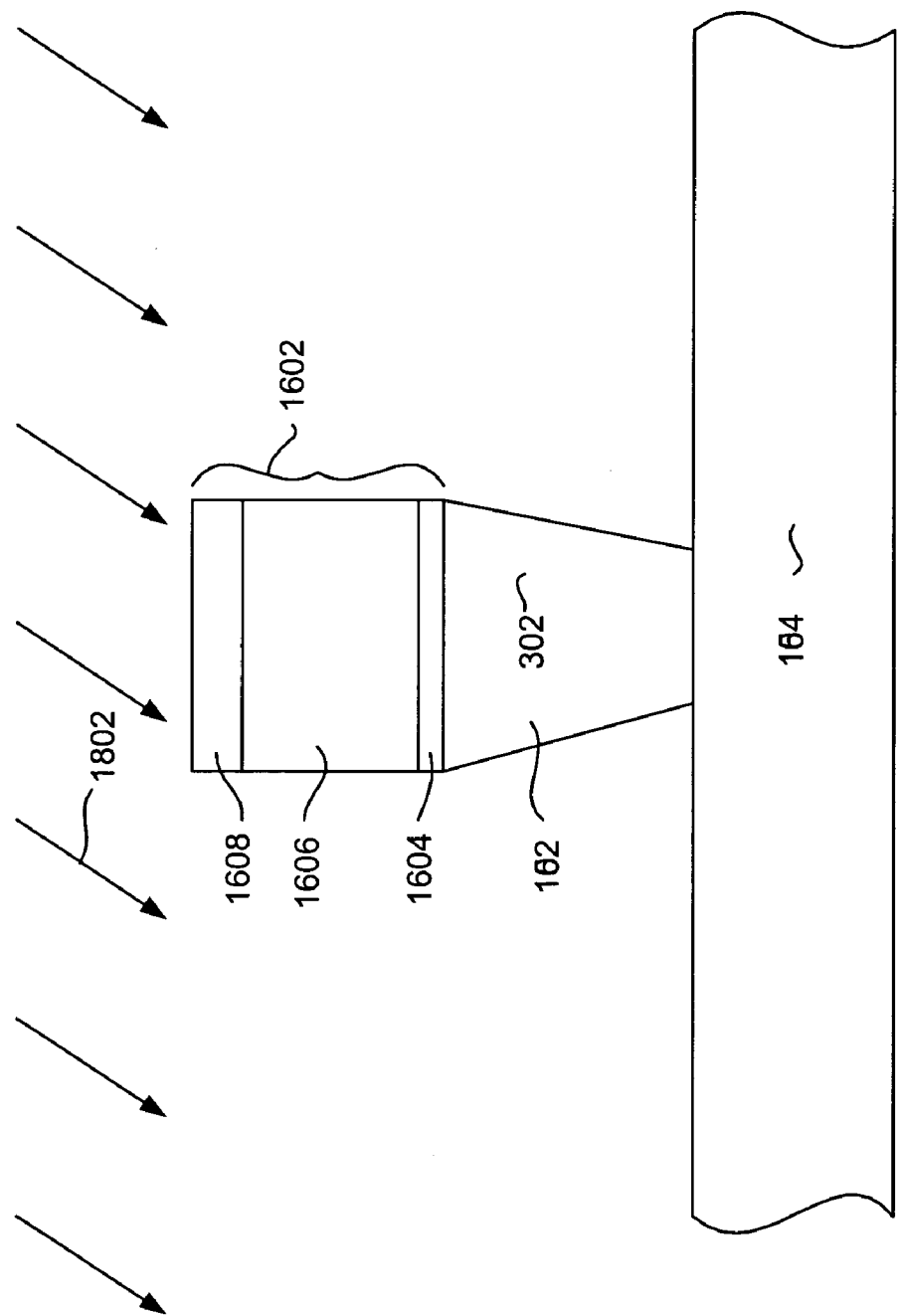

With reference to FIG. 17, a first ion mill 1702 is performed at a substantially normal (vertical) orientation to define the sides of the write pole. Then, with reference to FIG. 18, a second angled ion mill can be performed to form a beveled angle to the sides of the magnetic material 1502, resulting in a write pole 302 having a desired trapezoidal shape.

While various embodiments have been described above, it should be understood that they have been presented by way of example only, and not limitation. Other embodiments falling within the scope of the invention may also become apparent to those skilled in the art. For example although the invention has been described as being incorporated into a perpendicular recording system and would be particularly suited to use in such a system, the invention may be practiced in any magnetic recording system including a longitudinal magnetic recording system. Thus, the breadth and scope of the invention should not be limited by any of the above-described exemplary embodiments, but should be defined only in accordance with the following claims and their equivalents.

What is claimed is:

1. A magnetic write head for perpendicular magnetic recording, the write head comprising:
   a return pole;
   a shaping layer that is magnetically connected with the return pole;
   a write pole that is magnetically connected to the shaping layer;
   an electrically conductive coil a portion of which passes between the shaping layer and the return pole; and
   a magnetic shield; and wherein:
   the shaping layer has a first surface that is coplanar with a first surface of the shield;
   the shaping layer is thicker than at least a portion of the shield; and
   the shield has a second surface opposite the first surface, and further comprising a layer of alumina covering the second surface of the shield.

2. A write head as in claim 1 wherein the shield has a second surface, opposite the first surface, and further comprising a layer of non-magnetic material contacting the second surface of the shield.

3. A magnetic write head as in claim 1 further comprising a magnetic back gap disposed between and magnetically connecting the return pole and the shaping layer.

4. A magnetic write head as in claim 1, wherein the write head has an air bearing surface, the write head further comprising a magnetic pedestal disposed at the air bearing surface and contacting both the return pole and the shield.

5. A magnetic write head as in claim 1 wherein the shaping layer is thicker than the entire shield.

6. A magnetic write head for perpendicular magnetic recording and having an air bearing surface ABS, the write head comprising:
   a magnetic return pole;
   a magnetic back gap magnetically connected with the return pole and disposed away from the ABS;
   a magnetic shaping layer magnetically connected with the back gap and extending toward, but not to the ABS, the magnetic shaping layer having a leading surface and a trailing surface separated by a first thickness;
   a write pole magnetically connected with the shaping layer, the magnetic write pole extending to the ABS; and
   first and second magnetic shields disposed near and extending to the ABS, the first and second magnetic shields each having a leading surface and a trailing surface separated by a second thickness; and wherein:
   the leading surface of each of the magnetic shields is coplanar with the leading surface of the shaping layer; and
   the first thickness is larger than the second thickness.

7. A write head as in claim 6 wherein the first thickness is 0.5-1.0 um larger than the second thickness.

8. A write head as in claim 6 wherein the trailing surface of each of the first and second shields is covered with a non-magnetic material.

9. A write head as in claim 6 wherein the trailing surface of each of the first and second shields is covered with a non-magnetic material having a thickness of 0.5-1.0 um.

10. A write head as in claim 6 wherein the trailing surface of each of the first and second shields is covered with a layer of non-magnetic material that has a trailing surface that is coplanar with the trailing surface of the shaping layer.

11. A write head as in claim 6 wherein the trailing surface of each of the first and second shields is covered with a layer of alumina having a thickness that is substantially equal to the difference between the first thickness and the second thickness.

12. A magnetic write head for perpendicular magnetic recording, the write head comprising:
    a return pole;
    a shaping layer that is magnetically connected with the return pole;
    a write pole that is magnetically connected to the shaping layer;
    an electrically conductive coil a portion of which passes between the shaping layer and the return pole; and
    a magnetic shield; and wherein:
    the shaping layer has a first surface that is coplanar with a first surface of the shield;
    the shaping layer is thicker than at least a portion of the shield;
    the write head has an air bearing surface, the write head further comprising a magnetic pedestal disposed at the air bearing surface and contacting both the return pole and the shield; and
    the first surface of the shield defines an interface between the shield and the pedestal.

13. A magnetic write head for perpendicular magnetic recording, the write head comprising:
    a return pole;
    a shaping layer that is magnetically connected with the return pole;
    a write pole that is magnetically connected to the shaping layer;
    an electrically conductive coil a portion of which passes between the shaping layer and the return pole; and
    a magnetic shield; and wherein:
    the shaping layer has a first surface that is coplanar with a first surface of the shield;
    the shaping layer is thicker than at least a portion of the shield; and
    the shield includes a thin first portion and a thick second portion, and wherein the shaping layer has a thickness that is equal to the thickness of the second portion and is greater than the thickness of the first portion.

14. A magnetic write head for perpendicular magnetic recording, the write head comprising:
- a return pole;
- a shaping layer that is magnetically connected with the return pole;
- a write role that is magnetically connected to the shaping layer;
- an electrically conductive coil a portion of which passes between the shaping layer and the return pole; and
- a magnetic shield; and wherein:
- the shaping layer has a first surface that is coplanar with a first surface of the shield;
- the shaping layer is thicker than at least a portion of the shield;
- the shaping layer has a first surface and a second surface opposite the first surface the distance between the first and second surfaces defining a shaping layer thickness;
- the shield has a third surface that is coplanar with the first surface of the shaping layer;
- the shield has a thicker region having a fourth surface opposite the third surface, the fourth surface being coplanar with the second surface of the shaping layer; and
- the shield has a thinner region having a fifth surface opposite the third surface, the distance between the third and fifth surfaces defining a thickness that is less than the shaping layer thickness.

* * * * *